US011804688B1

(12) United States Patent
Coyle

(10) Patent No.: US 11,804,688 B1
(45) Date of Patent: Oct. 31, 2023

(54) THERMO-CONDUCTIVE BONDING OF LASER RODS WITH MECHANICAL ISOLATION

(71) Applicant: United States of America as represented by the Administrator of NASA, Washington, DC (US)

(72) Inventor: Donald B. Coyle, Ellicott City, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 557 days.

(21) Appl. No.: 16/904,796

(22) Filed: Jun. 18, 2020

(51) Int. Cl.
*H01S 3/02* (2006.01)
*H01S 3/06* (2006.01)

(52) U.S. Cl.
CPC .............. *H01S 3/025* (2013.01); *H01S 3/061* (2013.01)

(58) Field of Classification Search
CPC ........ H01S 3/04; H01S 3/0404; H01S 3/0405; H01S 3/0407; H01S 3/042; H01S 3/025; H01S 3/061; H01S 3/0602–0617
See application file for complete search history.

(56) References Cited

U.S. PATENT DOCUMENTS

| 4,849,036 A | * | 7/1989 | Powell | ................. C03C 4/0071 156/99 |
| 2005/0147140 A1 | * | 7/2005 | Aiken | ..................... H01S 3/092 372/35 |
| 2006/0245458 A1 | * | 11/2006 | Rapoport | ................ H01S 3/042 372/36 |

FOREIGN PATENT DOCUMENTS

| CN | 109004504 | * | 12/2018 | ........... H01S 3/0401 |
| DE | 19631265 | * | 2/1998 | ............. H01S 3/042 |
| WO | WO2007/103158 | * | 9/2007 | ........... A61B 18/203 |

OTHER PUBLICATIONS

Dictionary.com, definition of Silicone, pp. 1-4 (Year: 2023).*
Britanica.com, definition of Silicone, pp. 1-10 (Year: 2023).*

* cited by examiner

*Primary Examiner* — Tod T Van Roy
*Assistant Examiner* — Delma R Fordé
(74) *Attorney, Agent, or Firm* — Christopher O. Edwards; Matthew F. Johnston; Trenton J. Roche

(57) ABSTRACT

An apparatus and method for mounting a laser rod includes a mount having a cylindrical through hole in which the laser rod is disposed. A polymer is disposed in the cylindrical through hole in an annular space between an outer diameter of the laser rod and an inner diameter of the cylindrical through hole. The laser rod is suspended in a symmetrical thermal and mechanical interface. There is open access to the ends of the laser rod for end pumping and laser cavity alignment.

7 Claims, 7 Drawing Sheets

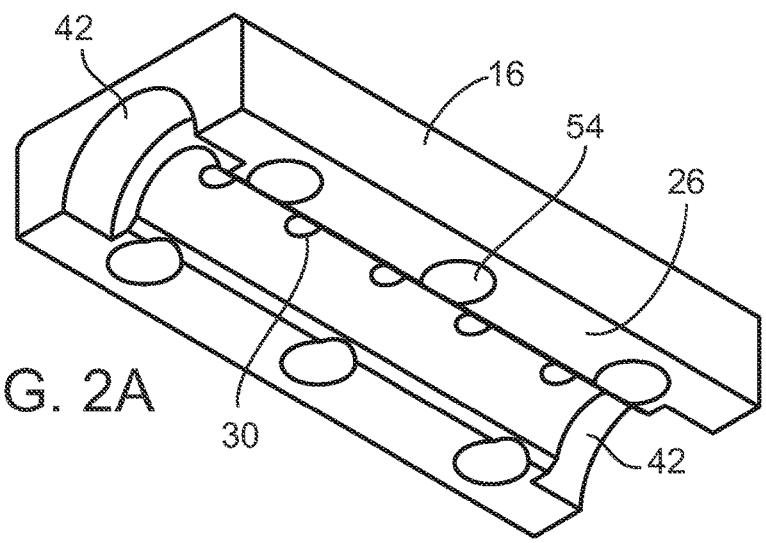
FIG. 2A
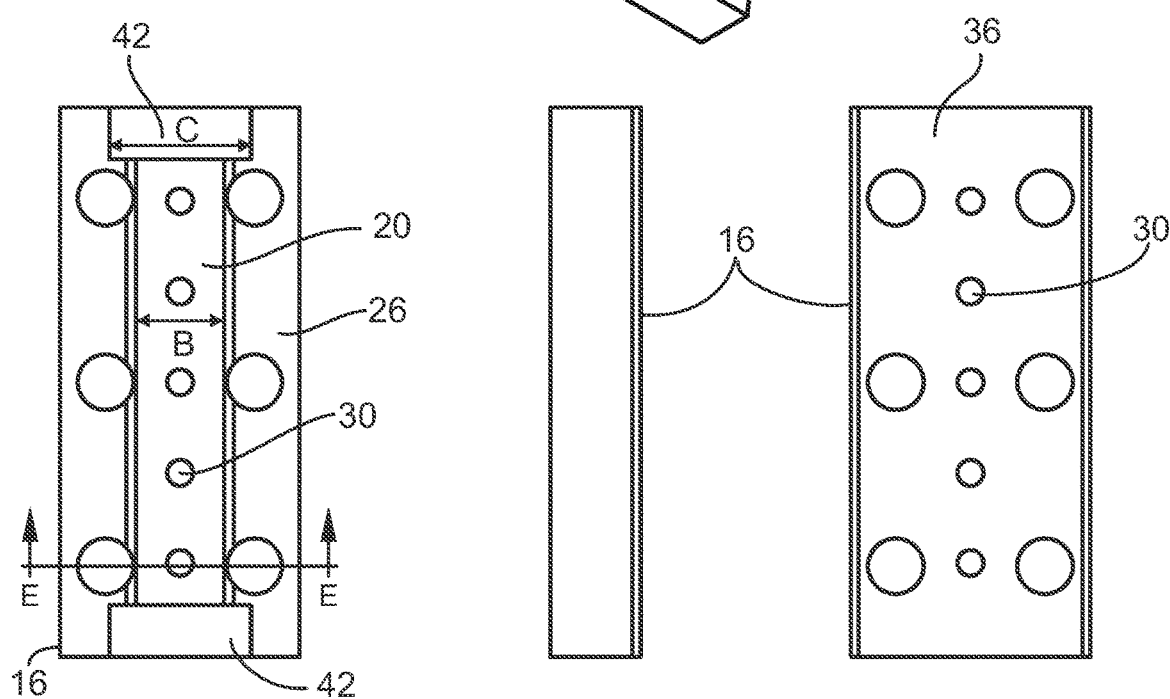
FIG. 2B
FIG. 2C
FIG. 2D
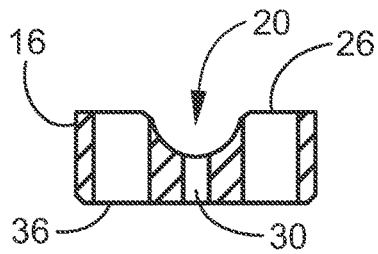
FIG. 2E

THERMO-CONDUCTIVE BONDING OF LASER RODS WITH MECHANICAL ISOLATION

ORIGIN OF INVENTION

The invention described herein was made by an employee of the United States Government, and may be manufactured and used by or for the Government for governmental purposes without the payment of any royalties thereon or therefore.

FIELD OF THE INVENTION

The present invention relates to lasers and in particular to mounting apparatus and methods for laser rods.

BACKGROUND

Large side-pumped laser slabs are typically bonded to a metal heat sink along one long side of the slab and the laser diode pump energy is directed into the gain through the opposing side. End pumped crystals are typically cylindrical rods. When operating with the high powers typically associated with side pumped slab systems, water cooling is usually needed due to the difficulty of using a bonding agent with symmetrical mechanical forces and heat conduction. Water cooling is difficult, if not impossible, nor desired for field or space flight laser transmitters. Recent improvements in high power fiber coupled laser diodes have enabled laser diode pump powers similar to those of two dimensional laser diode arrays.

If one pumps a small laser rod (on the scale of a few mm in diameter), it is difficult to pull excess heat out of the rod without fracture due to mechanical stress or thermal shock from low thermal conductivity. Yet, laser rods are desired over slabs because they generally produce higher quality laser beams as long as the gain medium can be reliably held thermo-mechanically. Small laser rods have been held with indium foil, or suspended with ½ or ⅓ of the rod held, or held in place with O-rings near the ends with water flowing around the cylindrical surface.

Indium foil has been used to fill the gap between the laser rod outer diameter (OD) and the laser rod mount's inner diameter (ID). However, over high temperature swings and extended times (weeks or months), the indium flows like a highly viscous fluid and the rod becomes loose in the mount. Or, at a minimum, the indium loses the thermal conductivity efficiency as the holding force weakens. Furthermore, if the laser powers become high enough to require efficient heat removal, the crystal expands in the mount and can be crushed by the high forces generated by the metal (for example, titanium, copper or aluminum) mount.

A need exists for an apparatus and method to mount a laser rod with high spatial precision, radially symmetric thermal conductivity, lengthwise continuity, allowance for thermal rod expansion, and enough stability to maintain mechanical properties over time.

SUMMARY

In one aspect of the invention, a mount for a cylindrical laser rod having a diameter A includes a lid portion and a base portion having mating faces fixed to each other. Each of the lid portion and the base portion includes a semi-cylindrical longitudinal opening in respective mating faces to thereby define a cylindrical through hole in the mount. The cylindrical through hole has a diameter B greater than the diameter A and a central longitudinal axis. Each end of the cylindrical through hole includes a counterbore having a diameter C greater than the diameter B. The lid portion includes a plurality of longitudinally spaced-apart through holes extending from the semi-cylindrical longitudinal opening in the lid portion to an exterior surface of the lid portion. The base portion includes a plurality of longitudinally spaced-apart through holes extending from the semi-cylindrical longitudinal opening in the base portion to an exterior surface of the base portion.

A laser rod may be disposed in the cylindrical through hole. A polymer may be disposed in the cylindrical through hole in an annular space between the outer diameter of the laser rod and the inner diameter of the cylindrical through hole.

Another aspect of the invention is a method of mounting a laser rod having a diameter A that includes providing a metal blank and forming a cylindrical through hole in the metal blank. The cylindrical through hole has a diameter B larger than the diameter A. Equally sized counterbores are formed in two ends of the cylindrical through hole. The counterbores have a diameter C larger than the diameter B. The method may include splitting the metal blank longitudinally into two portions such that each portion includes one half of the cylindrical through hole and one half of the counterbores. The two portions may be a lid portion and a base portion. A plurality of longitudinally spaced-apart through holes may be formed. The through holes may extend from the one half of the cylindrical through hole in the lid portion to at least one external surface of the lid portion. The method may include forming a plurality of holes extending from the one half of the cylindrical through hole in the base portion to at least one external surface of the base portion.

The method may further include providing the laser rod with an end cap on each end and placing the laser rod with end caps thereon in the one-half of the cylindrical through hole and the one-half of the counter bores in the base portion and then, fixing the lid portion to the base portion.

The method may include holding the end caps in place and then injecting a polymer into one or more of the plurality of holes in the lid portion and the plurality of holes in the base portion to fill an annular space between an outer diameter of the laser rod and an inner diameter of the cylindrical through hole. Then, the polymer is cured and the end caps are removed from the laser rod.

Another aspect of the invention is a laser module including a cylindrical laser rod having a diameter A and a metal mount having a cylindrical through hole. The cylindrical through hole has a diameter B greater than the diameter A and has a central longitudinal axis. Each end of the cylindrical through hole includes a counterbore having a diameter C greater than the diameter B. A plurality of through holes extends from the cylindrical through hole to exterior surfaces of the metal mount. The cylindrical laser rod is disposed in the cylindrical through hole and the counterbores.

The module may further include a polymer disposed in the cylindrical through hole in an annular space between an outer diameter of the laser rod and an inner diameter of the cylindrical through hole. In some embodiments, no polymer is disposed in the counter bores.

Further features and advantages of the invention will become apparent from the following detailed description taken in conjunction with the following drawings.

BRIEF DESCRIPTION OF THE DRAWINGS

FIG. 2A is a perspective view of an embodiment of a lid portion of a mount.

FIG. 2B is a bottom view of FIG. 2A.

FIG. 2C is a side view of FIG. 2A.

FIG. 2D is a top view of FIG. 2A.

FIG. 2E is a sectional view taken along the line E-E of FIG. 2B.

DETAILED DESCRIPTION

Some embodiments of the invention include an apparatus and method for mounting a laser rod (for example, 0.5-5.0 mm diameter) with high spatial precision, radially symmetric thermal conductivity, lengthwise continuity, sufficient pliability to allow for thermal rod expansion, and enough stability to maintain constant mechanical properties over time. These embodiments may hold small laser crystals and provide thermal conductivity and high precision mounting. The method may include a precise method of applying flight quality adhesive for small millimeter scale laser crystals used for high power fiber-coupled laser diode pump sources. The method may efficiently and repeatably enable highly symmetrical application of bonding agent having high elasticity to thereby reduce laser crystal stress due to vibration and temperature swings. An enclosed metal mount enables high rigidity, stability, and cooling, both radially and longitudinally. The embodiments of the invention do not use water-cooling to cool the laser rod.

Figure 1A:
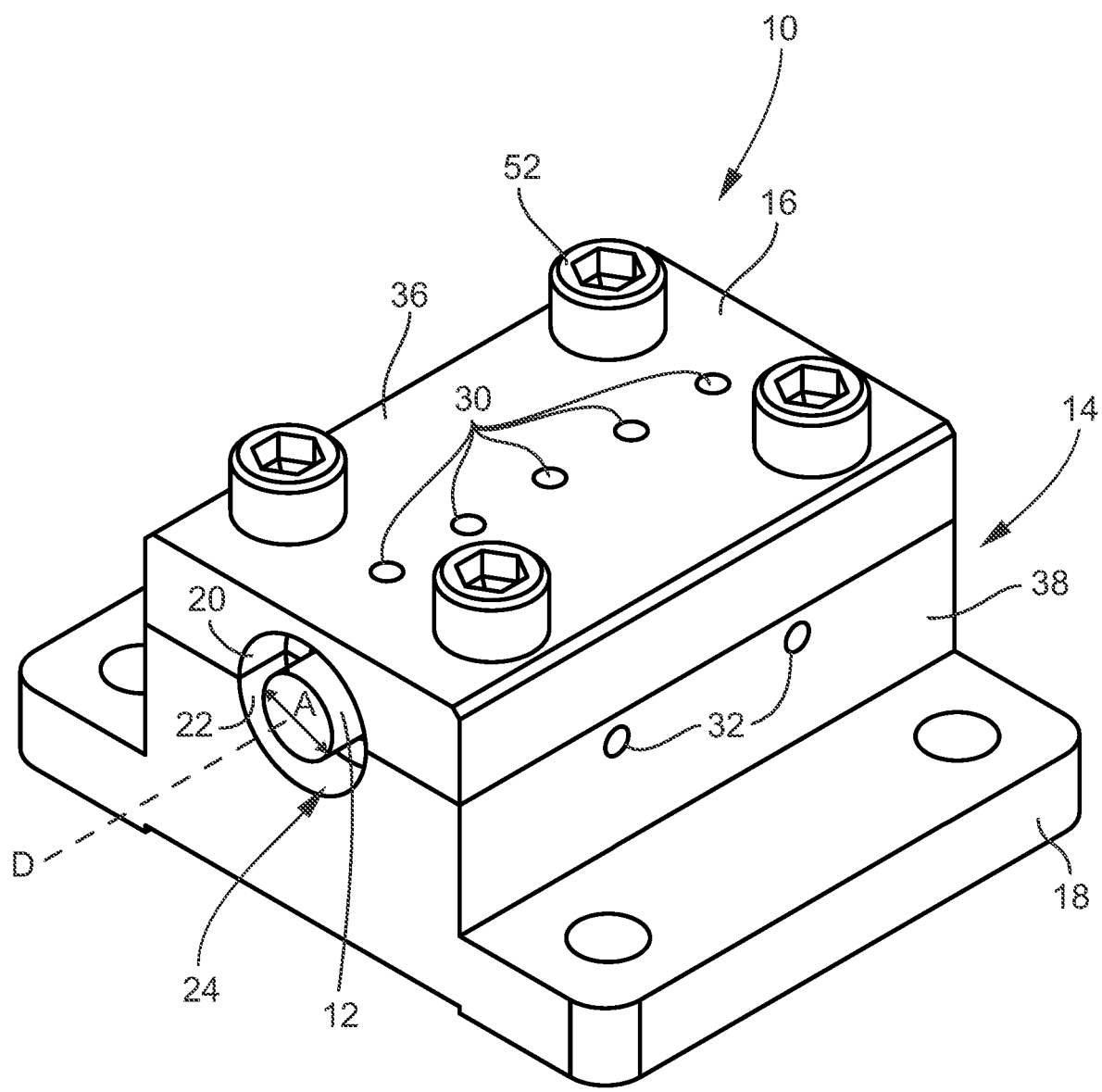
FIG. 1A is a perspective view of one embodiment of a laser module.
Figure 1B:
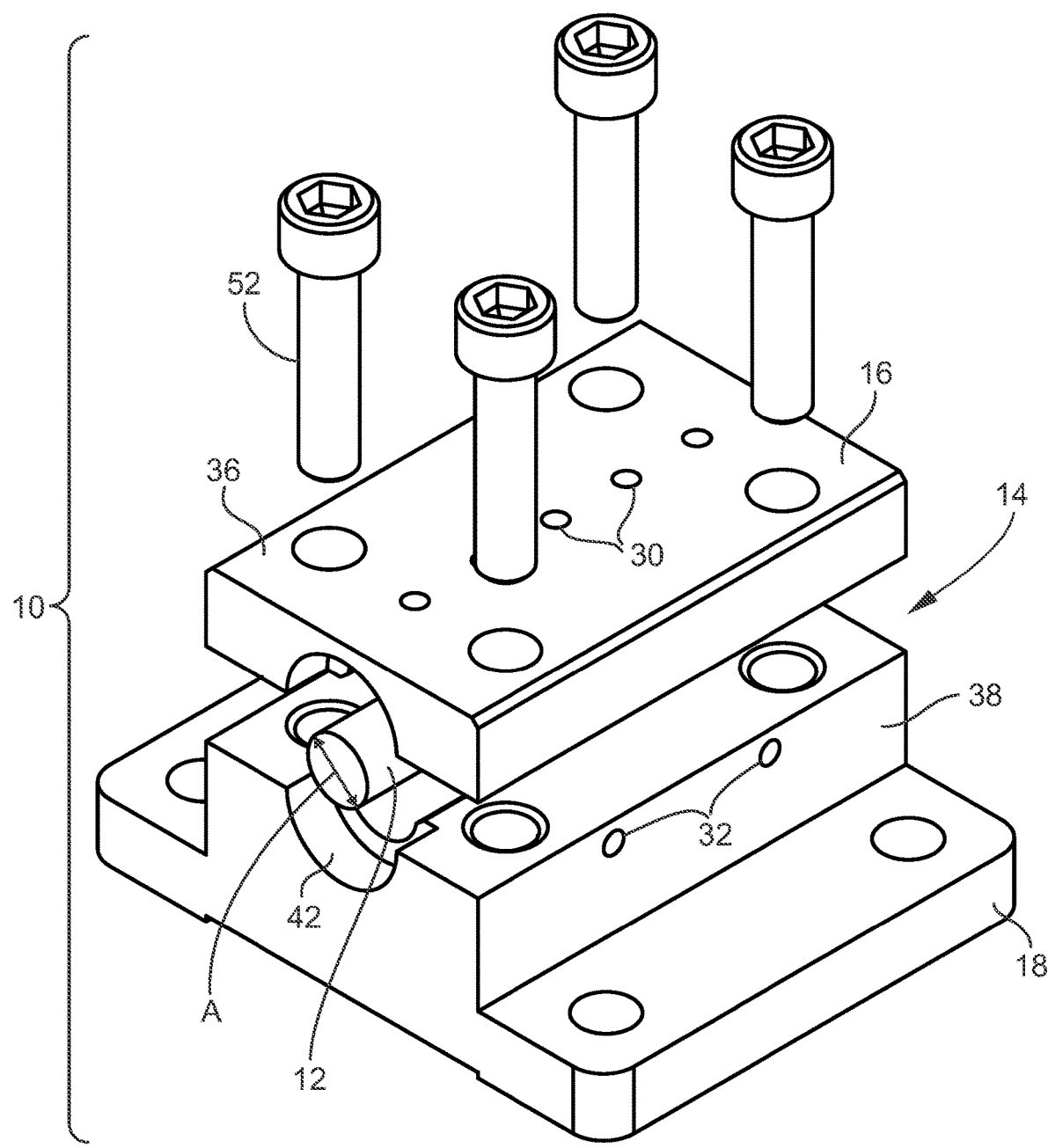
FIG. 1B is an exploded view of FIG. 1A.
Figure 1C:
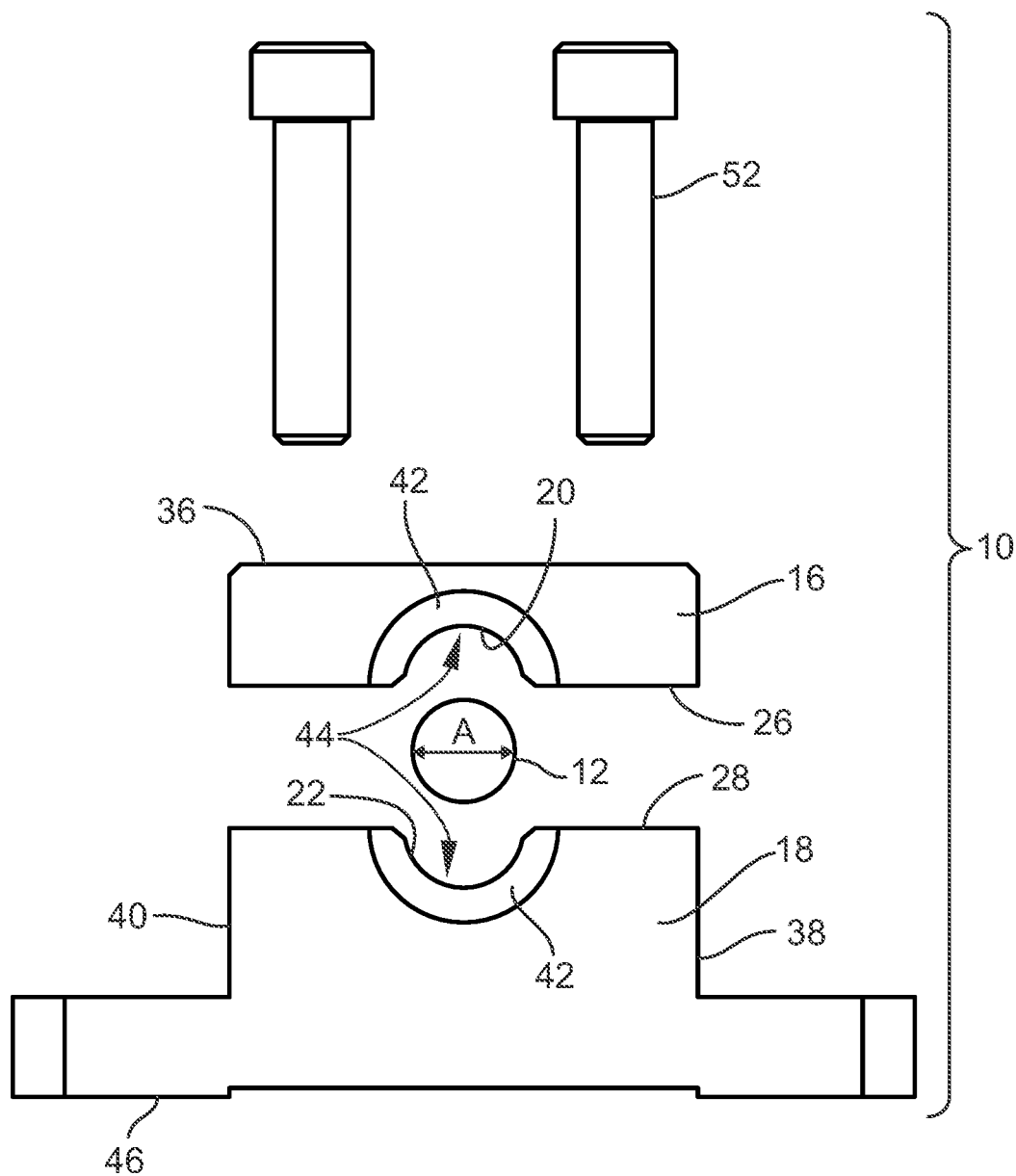
FIG. 1C is an end view of FIG. 1B.

FIG. 1 is a perspective view of one embodiment of a laser module 10. FIG. 1B is an exploded view of FIG. 1A. FIG. 1C is an end view of FIG. 1B. Module 10 includes a laser rod 12 having a diameter A and a mount 14. In some embodiments, diameter A is in a range of about 0.5 to about 5 mm. Mount 14 includes a lid portion 16 and a base portion 18. Mount 14 may have the shape of a rectangular prism. Lid portion 16 and base portion 18 are made of the same metal, for example, titanium, aluminum, or copper based materials. Lid portion 16 and base portion 18 have respective mating faces 26, 28 fixed to each other using, for example, fasteners 52.

Each of the lid portion 16 and the base portion 18 include respective semi-cylindrical longitudinal openings 20, 22 (FIG. 1A) in the respective mating faces 26, 28 to thereby define a cylindrical through hole 24 in the mount 14. The cylindrical through hole 24 has a diameter B (FIGS. 2B, 3B) and a central longitudinal axis D (FIG. 1A). Diameter B of the through hole 24 is larger than the diameter A of the laser rod 12. Laser rod 12 is disposed in the cylindrical through hole 24. Counterbores 42 (FIG. 1C) are disposed at each end of the cylindrical through hole 24. Counterbores 42 have a diameter C (FIGS. 2B, 3B) greater than the diameter B of the cylindrical through hole.

FIGS. 2A-E are views of lid portion 16. Lid portion 16 includes a plurality of longitudinally spaced-apart through holes 30. Holes 30 may extend from the semi-cylindrical longitudinal opening 20 in the lid portion to an exterior surface of the lid portion, such as top face 36. Holes 30 may extend in a direction perpendicular to the central longitudinal axis D and orthogonal to the top face 36 of the lid portion. FIGS. 3A-E are views of base portion 18. The base portion 18 includes a plurality of longitudinally spaced-apart through holes 32. At least one through hole 32 may extend from a side of the semi-cylindrical longitudinal opening 22 in the base portion to an exterior surface, such as side face 38, of the base portion. Base portion 18 may also include at least one through hole 32 extending from an opposite side of the semi-cylindrical longitudinal opening 22 in the base portion to another exterior surface, such as side face 40 (FIG. 3E), of the base portion.

Figure 5:
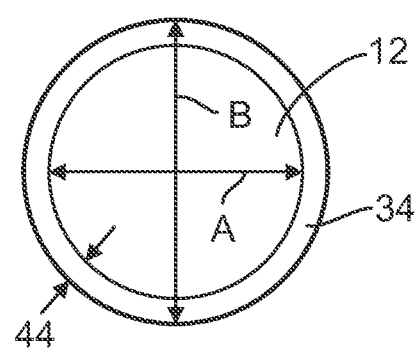
FIG. 5 is a schematic end view of a laser rod surrounded by polymer.

An annular space 44 (FIGS. 1C, 5) is defined between the outer diameter of laser rod 12 and the inner diameter of cylindrical through hole 24. Annular space 44 has a radial thickness of $(A-B)/2$. A polymeric bonding material 34 is disposed in annular space 44. No polymeric bonding material is disposed in counterbores 42. Polymer 34 may be a resilient thermal conductive polymer, similar to silicon-based or flexible cured thermally conductive sealant. An example of acceptable silicon-based polymers are NUSIL brand silicon polymers, such as Nusil CV-2946 (NuSil™ Technology LLC, 1050 Cindy Lane, Carpinteria, CA 93013 USA) with aluminum powder mixed in for thermal conductivity.

Figure 6:
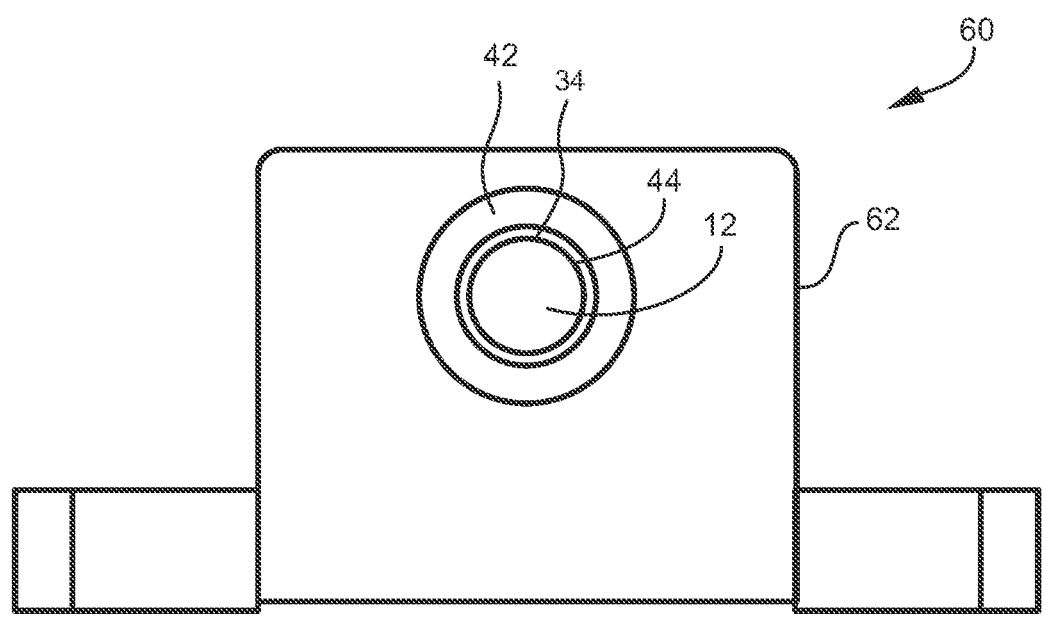
FIG. 6 is a front view of an embodiment of a laser module.

FIG. 6 is a front view of another embodiment of a laser module 60. Module 60 includes a mount 62 formed from a single block of material. Mount 60 is not split into lid and base portions as is mount 14. Module 60 includes laser rod 12 disposed in mount 60 and surrounded by polymer 34 in annular space 44. Module 60 includes features of module 10, including through hole 24 for laser rod 12, through holes 30 and 32 for polymer injection, and counterbores 42.

Method of Mounting Laser Rod

In one embodiment, a method of mounting a laser rod 12 having a diameter A includes providing a solid piece of metal, preferably in the shape of a "brick" or rectangular prism. A cylindrical through hole 24 is formed in the metal block. The cylindrical through hole 24 has a central longitudinal axis D and a diameter B larger than the diameter A. Preferably, axis D is parallel to the top and bottom faces 36, 46 of the metal block. Equal sized counterbores 42, 42 are formed in the metal block at opposite ends of the cylindrical through hole 24. The counter bores 42 have a diameter C larger than the diameter B. The metal block is split longitudinally into two portions 16, 18. Each portion 16, 18 includes one-half of the cylindrical through hole 24 and one-half of the counter bores 42, 42. As discussed above, holes 30 are formed in lid portion 16 and one or more holes 32 are formed in base portion 18.

Figure 3A:
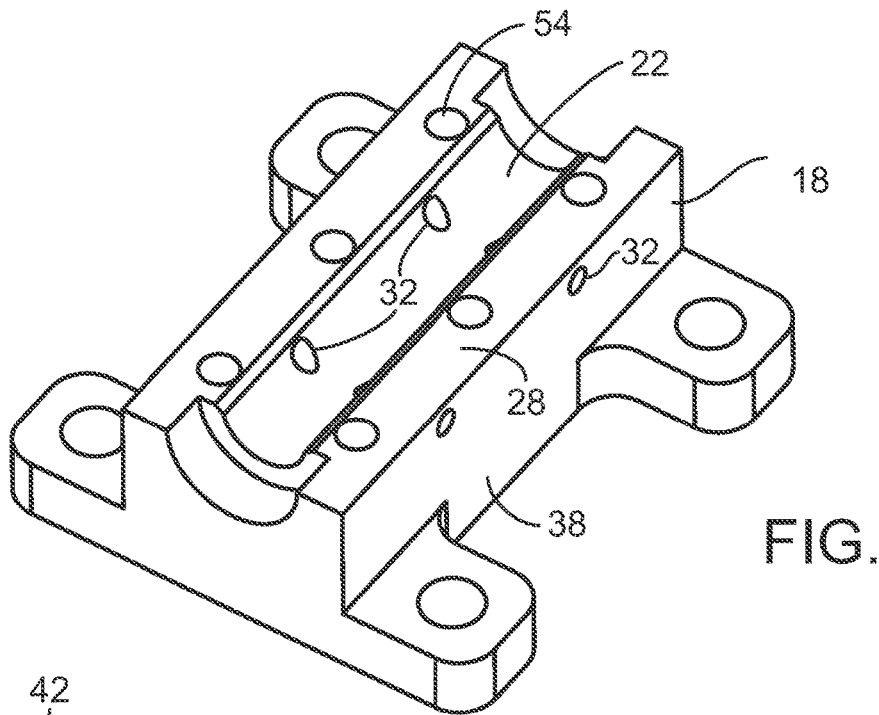
FIG. 3A is a perspective view of an embodiment of a base portion of a mount.
Figures 3B, 3C, 3D:
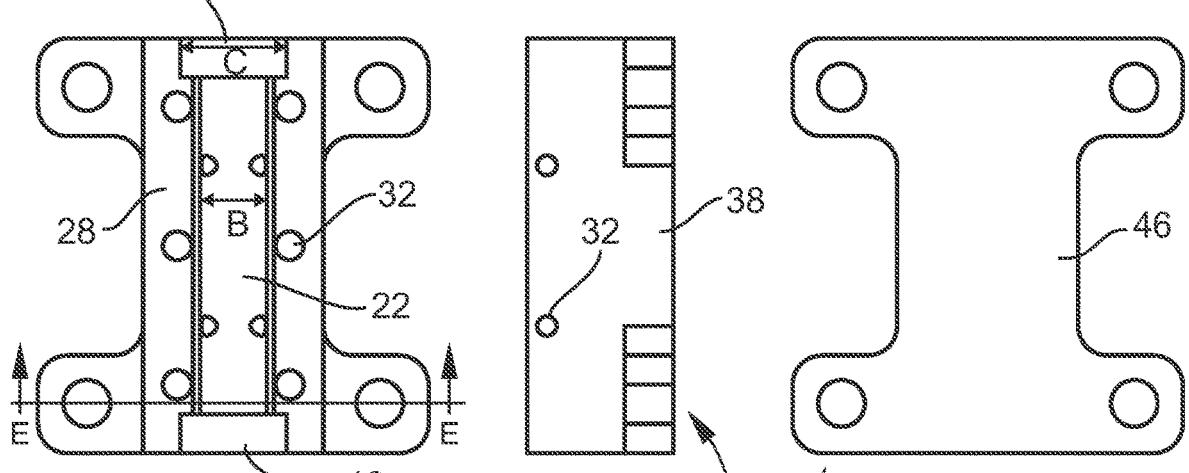
FIG. 3B is a top view of FIG. 3A.
FIG. 3C is an end view of FIG. 3A.
FIG. 3D is a bottom view of FIG. 3A.
Figure 3E:
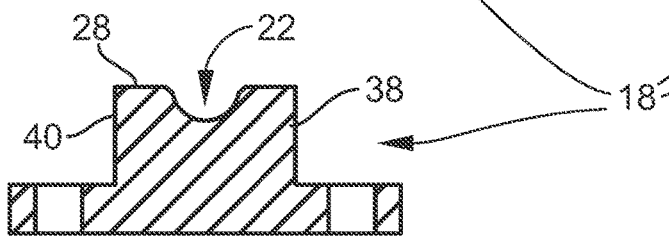
FIG. 3E is a sectional view taken along the line E-E of FIG. 3B.
Figure 4A:
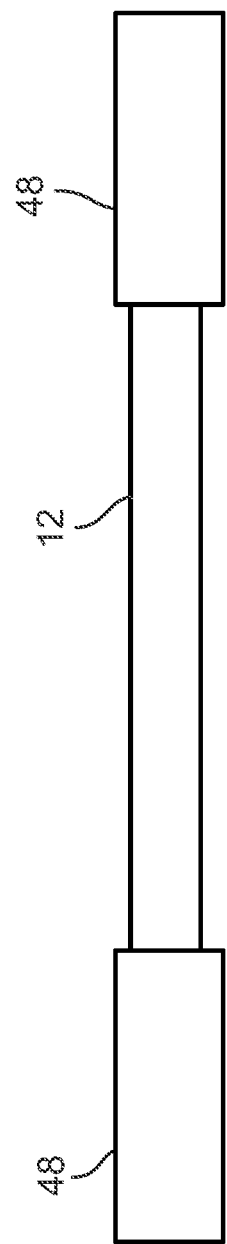
FIG. 4A is a schematic drawing showing end caps placed on opposite ends of a laser rod.
Figure 4B:
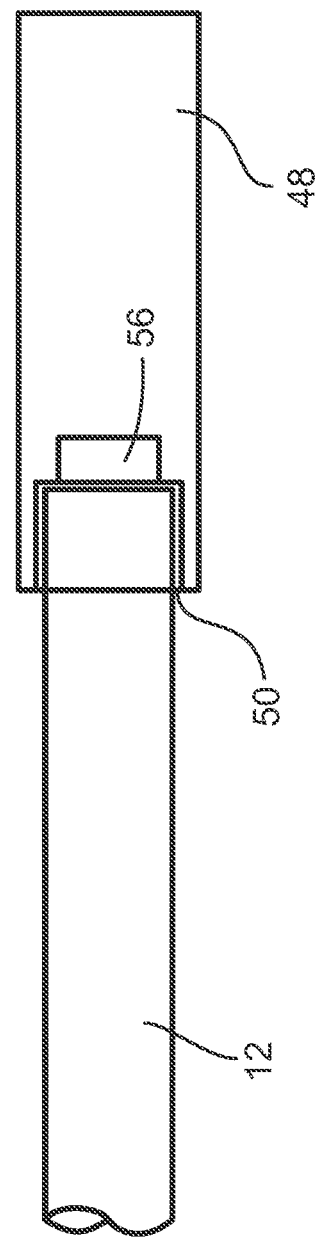
FIG. 4B is an enlarged schematic drawing showing the internal structure of the end caps of FIG. 4A.

FIG. 4A is a schematic drawing showing a pair of end caps 48 placed on opposite ends of laser rod 12. FIG. 4B is an enlarged schematic drawing showing the internal structure of the end caps 48 of FIG. 4A. End caps 48 may be made of, for example, TEFLON®. End caps 48 include end pockets 50 that are sized for a snug fit onto end of laser rod 12. Second pockets 56, smaller in diameter than end pockets 50, adjoin end pockets 50 and do not touch the end faces of laser rod 12. The laser rod 12 with end caps 48 attached is placed in semi-cylindrical opening 22 and in the halves of the counterbores 42, 42 in base portion 18. Then, the two portions 16, 18 are fixed to each other using, for example, threaded fasteners 52. The number of fasteners 52 may vary. For example, FIGS. 1A-C show four fasteners 52 and FIGS. 2A and 3A show openings 54 for as many as six fasteners 52. Polymer 34 is then injected into one or more of the holes 30, 32 until annular space 44 is filled with polymer 34 (see FIG. 5). Filling of the annular space 44 may be confirmed by observing the presence of polymer 34 is each of holes 30, 32. During the process of filling the annular space 44, the end caps 48 are held in place on rod 12 so that polymer 34 does not enter counterbores 42. End caps 48 may be held in place by, for example, abutting the ends of the end caps 48 against fixed blocks. After the polymer 34 is cured, the end caps 48 are removed from the laser rod 12 by sliding the end caps off the rod 12.

In another embodiment, rod 12 is disposed in mount 62 (FIG. 6) to form laser module 60. This method of mounting includes providing a laser rod 12 having a diameter A and a solid piece of metal, preferably in the shape of a "brick" or rectangular prism. A cylindrical through hole 24 is formed in the metal brick. The cylindrical through hole 24 has a central longitudinal axis D and a diameter B larger than the diameter A (see FIGS. 1A and 2B). Equal sized counterbores 42, 42 are formed in the metal block at opposite ends of the cylindrical through hole 24. The counter bores 42 have a diameter C larger than the diameter B (see FIG. 2B). As discussed above, holes 30 and one or more holes 32 are formed in the metal block (see FIGS. 2E and 3A). However, in module 60, the metal block is not split in half. Rod 12 is lowered into hole 24 and carefully assembled with end caps 48, and centered. Care is taken to not touch the polished and coated end faces of rod 12. Except for not splitting the metal block, the method of mounting the rod 12 in mount 62 is similar to the method for mounting rod 12 in mount 14.

EXAMPLE

A 3 mm diameter laser rod 12 with a length of 23 mm is provided. Rod 12 has high quality polished and coated end faces for high power laser beam production. The cylindrical surface of rod 12 has a ground finish. A metal "brick" is machined with a cylindrical through hole 24 down the middle. The diameter A of the center cylindrical through hole 24 determines the final thickness of the polymer bond 34 for a specific laser rod to be mounted. In this example, the center cylindrical through hole 24 is 5 mm diameter thereby providing a 1 mm annular bond gap 44 symmetrically around the 3 mm diameter rod 12, when bonded and cured. The metal brick is then further machined to add a 2 mm deep counter bore 42 in each end so the diameter C of the counter bore is 7 mm. Then, the mount 14 is divided longitudinally into two halves, a lid portion 16 and a base portion 18. Each portion 16, 18 has s semi-cylindrical trough 20, 22 extending longitudinally, with a wider and deeper section at each end that is 2 mm long. The 2 mm long wider and deeper sections are halves of the counterbores 42. So, there is a 19 mm long center semi-cylindrical trough 20, 22 with a 2.5 mm radius in each mount half 16, 18. It may be desirable for the laser rod 12 to extend slightly past the mount 14 to allow for safe optical cleaning, if needed.

As shown in FIGS. 4A and 4B, end caps 48 are fitted over each end of the laser rod 12. The fit may be a press fit, for example. The end caps 48 may be made of, for example, Teflon®. Each end cap 48 may be 10 mm or more in length. Each end cap 48 has an end pocket 50 placed over an end of rod 12 and the end pockets 50 are at least more than 2 mm long. The portions of end caps 48 at end pockets 50 have a 6 mm outside diameter. The end caps 48 fit snugly over each end of the laser rod 12. Then, the rod/sleeve assembly is placed precisely in the semi-cylindrical opening 22 of base portion 18.

The lid portion 16 is then placed on the base portion 18 that holds the rod/sleeve assembly. The two halves 16, 18 are fixed together with clamping screws 52. Each mount half 16, 18 has small (about 0.5 mm) holes 30, 32 machined therein and specifically located to allow injection of polymer 34 using, for example, hypodermic needles. There are sufficient holes 30, 32 placed to allow injection and weep holes for excess overflow of polymer 34.

Once assembled, the thermally conductive polymer 34, for example, a silicone polymer, is injected into selective holes 30, 32 until the annular gap 44 and the holes 30, 32 are filled with the polymer 34, such as Nusil CV-2946 (NuSil™ Technology LLC, 1050 Cindy Lane, Carpinteria, CA 93013 USA). As the polymer 34 is injected in the holes 30, 32, the end caps 48 are held in place (for example, with clamps or fixed blocks) so as not to push out from the force of the injected polymer 34. When the polymer 34 has sufficiently cured (typically 24 hours at room temperature), the end caps 48 are simply removed, thereby exposing the end portions of the clean laser rod 12 and the polished end faces. The laser rod 12 is now suspended in a symmetrical thermal and mechanical interface. There is open access to the ends of the laser rod 12 for end pumping and laser cavity alignment.

This technique may be applicable and scalable to rods of differing lengths and diameters. It may be possible to scale up to larger high power rods such as those typically found in flashlamp pumped and water-cooled research and commercial systems. This method enables fine tuning the mechanical stability and the thermal conductivity using readily modeled coefficients from the polymer manufacturer.

Commercial solid state laser systems have a "no-mans land" in average powers vs. thermal management vs. pumping configuration vs. laser crystal design. Small laser rods on the order of a few mm diameter can produce near perfect, diffraction limited beams when coupled with the appropriately designed laser cavity design and pump parameters. However, there are hard limits in laser average power production with each laser system being affected by the laser rod mounting scheme. Small laser rods can increase performance and reliability when mounted in accordance with the techniques disclosed herein.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A mount for a cylindrical laser rod having a diameter A, comprising:
   a lid portion and a base portion having mating faces fixed to each other;
   each of the lid portion and the base portion including a semi-cylindrical longitudinal
   opening in the respective mating faces to thereby define a cylindrical through hole in the mount, the cylindrical through hole having a diameter B greater than the diameter A and a central longitudinal axis;
   each end of the cylindrical through hole including a counterbore having a diameter C greater than the diameter B;

the lid portion including a plurality of longitudinally spaced-apart through holes extending from the semi-cylindrical longitudinal opening in the lid portion to an exterior surface of the lid portion;

the base portion including a plurality of longitudinally spaced-apart through holes extending from the semi-cylindrical longitudinal opening in the base portion to an exterior surface of the base portion;

the laser rod disposed in the cylindrical through hole; and a polymer disposed in the cylindrical through hole in an annular space between the outer diameter of the laser rod and the inner diameter of the cylindrical through hole;

wherein the plurality of through holes in the base portion includes at least one through hole extending from a side of the semi-cylindrical longitudinal opening in the base portion to the exterior surface of the base portion and at least one through hole extending from an opposite side of the semi-cylindrical longitudinal opening in the base portion to another exterior surface of the base portion.

2. The mount of claim 1, wherein no polymer is disposed in the counterbores.

3. The mount of claim 1, wherein the lid and base portions are made of one of titanium, aluminum or copper based materials.

4. The mount of claim 1, wherein diameter A is in a range of about 0.5 to about 5 mm.

5. The mount of claim 1, wherein the exterior surface of the lid portion is a top face of the lid portion and the plurality of longitudinally spaced-apart through holes that extend from the semi-cylindrical longitudinal opening in the lid portion to an exterior surface of the lid portion extend from the semi-cylindrical opening in a direction perpendicular to the central longitudinal axis and orthogonal to the top face of the lid portion.

6. The mount of claim 5, wherein the exterior surface of the base portion is a side face of the base portion and the other exterior surface of the base portion is an opposite side face of the base portion.

7. The mount of claim 1, wherein the polymer is a silicon-based polymer.

* * * * *